US012613822B2

(12) United States Patent
Cholewicki et al.

(10) Patent No.: US 12,613,822 B2
(45) Date of Patent: Apr. 28, 2026

(54) BUS NODE AND PLUG-IN CONNECTOR FOR A COMMUNICATION BUS SYSTEM WITH BUS TERMINATION CONFIGURATION COMPONENT

(71) Applicant: ZF CV Systems Europe BV, Brussels (BE)

(72) Inventors: Lukasz Cholewicki, Wroclaw (PL); Ralph Schumacher, Norderstedt (DE); Robert Sohn, Hannover (DE); Daniel Stahl, Wunstorf (DE)

(73) Assignee: ZF CV Systems Europe BV, Brussels (BE)

( * ) Notice: Subject to any disclaimer, the term of this patent is extended or adjusted under 35 U.S.C. 154(b) by 29 days.

(21) Appl. No.: 18/824,738

(22) Filed: Sep. 4, 2024

(65) Prior Publication Data

US 2024/0427718 A1 Dec. 26, 2024

Related U.S. Application Data

(63) Continuation of application No. PCT/EP2022/055499, filed on Mar. 4, 2022.

(51) Int. Cl.
*G06F 13/36* (2006.01)
*F16K 31/06* (2006.01)

(52) U.S. Cl.
CPC .............. *G06F 13/36* (2013.01); *F16K 31/06* (2013.01); *G06F 2213/40* (2013.01)

(58) Field of Classification Search
CPC ...... G06F 13/36; G06F 2213/40; F16K 31/06; H04L 2012/40215; H04L 2012/40273;
(Continued)

(56) References Cited

U.S. PATENT DOCUMENTS 6,378,025 B1 * 4/2002 Getty ................. G06F 13/4086
326/30
7,855,573 B1 12/2010 Yost
(Continued)

FOREIGN PATENT DOCUMENTS

DE 10 2018 220 073 A1 5/2020
EP 2 166 717 A1 3/2010
(Continued)

OTHER PUBLICATIONS

Written Opinion of the International Searching Authority dated Oct. 28, 2022 for international application PCT/EP2022/055499 on which this application is based.
(Continued)

*Primary Examiner* — Farley Abad
(74) *Attorney, Agent, or Firm* — Walter Ottesen, P.A.

(57) ABSTRACT

Communication bus systems have at least one twisted wire pair cable used as a physical medium. Such communication bus systems require bus termination at least at the end point bus nodes. Often the communication bus system includes a plurality of equitable bus nodes which are connected to the communication bus. A bus node includes an interface circuit to a communication bus. The interface circuit includes a bus termination circuit arrangement which includes at least a connection arrangement to at least one configuration component. In this way, it is easy to activate/deactivate bus termination for the single bus node by placing the configuration component manually in the manufacturing process.

14 Claims, 7 Drawing Sheets

(58) Field of Classification Search
CPC ........... H04L 12/40006; H04L 25/0298; H04L
12/40
See application file for complete search history.

(56) References Cited

U.S. PATENT DOCUMENTS

| | | | | |
|---|---|---|---|---|
| 10,785,066 | B1 | 9/2020 | van Dijk | |
| 10,922,264 | B1 | 2/2021 | Adamson et al. | |
| 2003/0137860 | A1 * | 7/2003 | Khatri | H05K 1/0246 |
| | | | | 365/63 |
| 2005/0122131 | A1 | 6/2005 | McCollum et al. | |
| 2007/0293082 | A1 * | 12/2007 | Sumitani | H01H 85/2035 |
| | | | | 439/507 |
| 2012/0042109 | A1 * | 2/2012 | Schier | H04L 12/40032 |
| | | | | 710/305 |
| 2014/0047152 | A1 | 2/2014 | Peters et al. | |
| 2016/0079892 | A1 | 3/2016 | Arafat et al. | |
| 2016/0254925 | A1 | 9/2016 | Riedel | |
| 2017/0158102 | A1 * | 6/2017 | Murray | B60N 2/0233 |
| 2021/0001679 | A1 * | 1/2021 | Meier | B60G 17/052 |

FOREIGN PATENT DOCUMENTS

| | | | | |
|---|---|---|---|---|
| EP | 3 040 871 | A1 | 7/2016 | |
| EP | 2684139 | B1 * | 4/2018 | H04L 25/0298 |
| WO | 2019/199990 | A1 | 10/2019 | |

OTHER PUBLICATIONS

International Search Report of the European Patent Office dated Oct. 28, 2022 for international application PCT/EP2022/055499 on which this application is based.

* cited by examiner

BUS NODE AND PLUG-IN CONNECTOR FOR A COMMUNICATION BUS SYSTEM WITH BUS TERMINATION CONFIGURATION COMPONENT

CROSS-REFERENCE TO RELATED APPLICATIONS

This application is a continuation application of international patent application PCT/EP2022/055499, filed Mar. 4, 2022, which designates the United States.

TECHNICAL FIELD

The disclosure relates to the technical field of networking electronic components in vehicles, in particular commercial vehicles. More and more electronic components that can exchange messages with each other are being integrated into vehicles. Various communication networks have been developed for this purpose. The distance most frequently used communication protocol used in vehicles is the CAN bus communication protocol. The CAN bus, corresponding to the "Controller Area Network", has already been found in vehicles for 1991. The CAN bus communication protocol was standardized 1994, and the ISO standard has the number ISO 11898. Later, further variants of this bus system have been standardized. A very prominent example is the so-called vehicle bus according to the standard SAE J1939 which is published by the "Society of Automotive Engineers", now known as "SAE International".

BACKGROUND

For the CAN bus line, a twisted pair cable without shielding is normally used as the physical transmission medium. Some manufacturers prefer the use of a twisted pair cable with shielding.

The topology of the CAN bus corresponds to a linear bus line to which multiple bus nodes can be attached. The maximum data rate is 500 kbit/s for the classical CAN bus and for the enhanced version CAN FD with an extended payload field it is 5 Mbit/s. ISO 11898 specifies the maximum number of CAN nodes connected to the bus line as 32. The ISO standard 11898 specifies that the CAN bus cable is a single-twisted-pair cable with a characteristic impedance of 120Ω. Furthermore, the standard states that both ends of the bus must be terminated with resistors equal to the cables' characteristic impedance. The communication via the CAN bus line requires a termination of the bus line in order to avoid signal reflections at the end of the cable according to ISO norm ISO 11898-5:2007. The most common bus termination techniques are standard termination and split termination where standard termination is in the form of a single resistor and split termination corresponds to an arrangement with two resistors in series and a capacitor to ground in between.

FIG. 1 shows an example of the standard termination technique. There are three bus nodes ECU1 to ECU3 connected to the CAN bus B1. The two twisted-pair bus wires are labelled CH and CL corresponding to CAN-High and CAN-Low. At both ends of the linear bus line B1, the twisted-pair cable is terminated by soldering a resistor R1 to the bus wire CH and CL. This resistor R1 should have a resistance of 120Ω corresponding to the impedance of 120Ω of the bus cable. The resistors R1 may be placed inside of the bus nodes ECU1 and ECU3. For drawing purposes, the resistors R1 are illustrated to be integrated in the bus cable.

The principle architecture of the bus nodes is also illustrated in FIG. 1, too. Reference signs H1 to H3 denote the host controller of the respective bus node. Reference signs CCT1 to CCT3 label the CAN controller of the respective bus node ECU1 to ECU3. Reference signs CT1 to CT3 denotes the CAN transceiver of the respective bus node ECU1 to ECU3.

An electronic control unit (ECU) that wants to participate in CAN communication requires a CAN interface. This includes a CAN controller and a CAN transceiver. The CAN controller fulfills communication functions prescribed by the CAN protocol and relieves the host considerably. The CAN transceiver connects the CAN controller to the physical transmission medium.

FIG. 2 shows the principal split termination technique. The CAN bus is located on the left side of the drawing. The two connection points to the two bus wires CH and CL are seen of the left side. On the right of the drawing the CAN transceiver is depicted and labelled CT1. For split termination there are two resistors R2, R3 used, that are equal to one half of the cable's characteristic impedance, that is, 60Ω. There is also a capacitor C1 placed between the series connection of the two resistors R2 and R3 and ground. The capacitor C1 typically has a capacity of 4.7 nF. Although the split termination technique uses more components, it offers the added benefit of creating a low-pass filter such that higher frequency interferences on the bus line B1 are prevented to pass the CAN transceiver CT1.

From U.S. Pat. No. 10,785,066 B1, DE 10 2018 220 073 A1 and more sophisticated bus termination technique are known which improve the CAN communication failure reliability.

In modern vehicles there is a great variety of electronic components with communication capability over internal communication busses including but not limited to the CAN bus. Among them are ECU's, sensor unit and actuator unit, communication unit and more. Examples of ECU's are engine control units, brake control units, transmission control units, ADAS control units (advanced driver assistance systems), safety system control units, such as airbag control units and seat belt strengthening control unit, air condition control units, et cetera. Examples of actuator units are electric motors, magnetic valves, electric pumps, electric compressors, electric heaters, et cetera. Examples of sensor units are camera units, radar units, lidar units, ultrasonic units, thermo elements, rotary sensors, voltage measurement units, current measurement units, inertial measurement units, magnetic field measuring units, light sensors, et cetera.

These components may not be connected to a single communication bus but to multiple communication busses which may be interconnected with the help of gateway units. Sometimes an electronic control unit ECU may have a private CAN bus to which all actuators and or sensors are connected.

An example of such an ECU is an Electronically Controlled Air Suspension System ECU, the so-called ECAS ECU. Such a system may be provided in commercial vehicles and in other vehicles as well, such as cars.

FIG. 3 shows a commercial vehicle 10 equipped with three axles, a front wheel axle, a back-wheel axle and a lift axle. It may be a towing vehicle or any other form of utility vehicle. Other examples which may be mentioned are utility vehicles which are used in agriculture, or construction vehicles or camping vehicles. Finally, it is noted that the listing is not exhaustive. The term commercial vehicle is also used here only by way of example. Embodiments of the disclosure can also be used in other vehicles. Thus, passenger cars can likewise be equipped with the subject matter of the disclosure. Other vehicles also include buses and construction and harvesting machines, as well as motorcycles, robots, aircraft and drones. However, it may also be a trailer vehicle, for example trailer vehicles which are used in agriculture, or trailer vehicles which are attached to construction vehicles. Larger caravans, as well as leisure and sports trailers, are also suitable.

The vehicle 10 is equipped with a drive unit, which corresponds typically to an internal combustion engine. Of course, other types of drive units can also be integrated in the towing vehicle. As a further example, electric motors in combination with accumulators or fuel cells are mentioned. Of course, a braking system is also included. In case of a commercial vehicle, it may be equipped with a braking system which may include service brakes and retarder brakes. These components are not shown in FIG. 3.

FIG. 3 shows an ECAS system of a commercial vehicle 10. The ECAS ECU is labelled with reference number 100. The other components CU1 to CU3 are ECAS actuators which are controlled by the ECAS-ECU 100. These ECAS actuators are so-called ECAS SPA devices (Electronically Controlled Air Suspension Smart Pneumatic Actuator). These ECAS actuators CU1 to CU3 also have control capability, and they may themselves be connected to one or more sensor units which provide them with feedback about the control process. The primary task of the ECAS actuators CU1 to CU3 is to increase or decrease the pressure in the air spring bellows FB1 to FB6 which are mounted at each side of each axle of the vehicle 10. FIG. 3 shows a vehicle with 3 axles, a front axle VA, a back-axle HA and a lift axle LA. A pressure reservoir PR is mounted on the vehicle 10 to supply the pneumatic systems of the vehicle with pressurized air. Also, the ECAS system is a pneumatic system and needs to be connected with the pressure reservoir PR. The pressure line guiding the pressurized air to the ECAS actuators CU1 to CU3 is labelled with reference sign CAL. Each ECAS actuator CU1 to CU3 is equipped with one or more magnetic valve, a host controller and a bus interface to the private CAN bus B1 of the ECAS ECU 100. The ECAS ECU 100 may be connected to a vehicle CAN bus corresponding to SAE J1939 and communicate to other ECU's via this vehicle CAN bus or other vehicle communication bus. With the help of the ECAS actuators the ECAS system may control the suspension characteristics of the vehicle.

ECAS systems are used in motor vehicles since the early 1980s. Sometimes there is relatively large static axle load differences on the rear axle of the motor vehicle between empty and fully loaded status. They lead to problems in the steel spring configuration in empty and partial load conditions. The suspension properties deteriorate. ECAS systems are used to solve these problems. Main advantages are:

the entire spring deflection is fully available for compensating dynamic axle load changes;

static axle load changes are compensated by pressure changes;

driving comfort is increased;

the wheels are consistently solid on the road, which leads to an improved braking and steering behavior and significantly increases tire life.

The suspension control needs to be performed per axle or per air spring bellow such that an ECAS system contains several, that is, two or more, equitable ECAS actuators (as modulators, slaves) and one ECAS ECU (as control device, master).

In the embodiment depicted in FIG. 3 we have one ECAS ECU 100 and three equitable ECAS actuators CU1-CU3 one each for an axle. All the four ECAS devices are connected to the same CAN bus B1, however only the first ECAS device 100 and the last ECAS device CU3 must use a bus termination according to ISO norm ISO 11898-5:2007.

Switchable split termination can be achieved by software support. From EP 2 166 717 A1 a software controllable CAN bus terminating component is known, allowing the bus node to be correctly connected to a CAN-bus at a terminating position and at a non-terminating position.

In case of software configuration one microcontroller digital output is used to enable CAN termination. This has the disadvantage that software failures could disrupt the whole CAN communication for all devices. In addition, software-controlled termination is unpractical during the CAN identifier learning procedure, because the procedure requires a CAN termination, but CAN termination is only possible after each bus node knows its assigned CAN identifier ID (chicken or egg causality dilemma). If a shielded CAN-bus cable is required, an additional pin would be necessary.

In case of a switchable termination via hardware means, the resistors R2, R3 for split termination must be integrated either in the socket of the bus node or in the plug-in connector or in the wire harness of the bus cable. For split termination, a third pin is required to connect the resistors R2, R3 to the ground capacitor C1 in order to achieve an RC low-pass which affects only the noise due to the virtual zero. This configuration has the disadvantage that the mechanical production is complicated with respect to water tightness, double occupied crimp contacts, corrosion protection of solder joints, mechanical stress and costs especially due to the third pin. Again, if a shielded CAN-bus cable is required, an additional pin would be necessary.

The middle point of this split termination is a so-called virtual zero. This means that the point voltage is zero due to the need of signal annihilation on the CAN-High and CAN-Low bus wires. The resistors R2, R3 and the capacitor C1 of the split termination create an RC low-pass filter which attenuates only noise signals but not the differential CAN bus signals due to the virtual zero.

For the series production of this kind of equitable bus nodes there exist a plurality of economic constraints, too. To produce inexpensively and reduce the degree of complexity the equitable bus nodes should preferably be identical in the production process. Since however, CAN termination may only be applied for the last of the equitable devices in a row of bus nodes, there is a problem existing how this could be achieved. The last device is defined as the device which is physically farthest away from the domain ECU in terms of wire harness. Due to functional safety reasons during the CAN ID learning procedure it is meaningful to make use of a hardware solution for configuring the bus node which should use bus termination.

The usual implementation places the resistors R2, R3 in the socket of the bus node between CAN-High and CAN-Low input pin. However, in case of split termination a third connection to the virtual zero is also needed. Due to the importance of the virtual zero a simple two pin solution therefore is not possible. Otherwise the RC low-pass would affect the differential CAN bus signals and not only the noise.

SUMMARY

It is therefore an object of the disclosure to configure a CAN bus termination with hardware configuration which overcomes the drawbacks as above mentioned. In particular, the solution should fulfill the requirement of identical series production of the equitable bus nodes. In addition, only a minimum of additional pins should be provided in the connectors for this purpose. The production costs shall be minimized. Double occupied crimp contacts are not allowed.

This object is, for example, achieved by a bus node for a communication bus system having end points. The bus node includes: an interface circuit to the communication bus; the communication bus requiring a bus termination at least at the end points thereof; the interface circuit including a bus termination circuit arrangement; and, the bus termination circuit arrangement including at least a connection arrangement to at least one configuration component.

In a general embodiment of the disclosure a bus node includes an interface circuit to a communication bus, wherein the communication bus requires a bus termination at least at the end points of the communication bus, wherein the interface circuit includes a bus termination circuit arrangement. In addition, the bus termination circuit arrangement includes at least a connection arrangement to at least one configuration component.

To the extreme, this disclosure enables a solution for bus termination, be it in the form of standard termination or split termination with only two pins without external resistors. If these pins are short-circuited via a wire harness jumper, the bus termination is enabled, otherwise disabled. If these pins are not short-connected, bus termination is disabled, otherwise enabled. In addition, one pin can be internally connected to a so-called bus shielding if a shielded bus cable is used to shield the bus wire-harness.

Embodiments of the disclosure may be used for different types of communication busses, including but not limited to a CAN bus.

In an embodiment, the configuration component includes at least one jumper. This proposal has the advantage that it is inexpensive, easy to handle during production and very reliable since it is possible to configure a jumper inclusive gasket such that the contact clamp in which the jumper is plugged is sealed against dirt and humidity such that corrosion is not an issue. If the jumper is not placed in the connection arrangement, the contact clamps may be easily protected against dirt and humidity by placing blind plugs in the corresponding openings.

For communication busses in the automotive field it is common that the communication bus includes at least one single twisted pair cable as physical medium. This is since they are light weighting, and rather low-cost cables. Very advantageous is i) that the impedance deviation is minimized through the wire since both wires are tight together through uniform wire stranding, and more important ii) the wires can be more easily installed and kinked in such a way that both wires have identical lengths in order to reduce cable skew. Particularly for these twisted pair cables the solution according the disclosure is advantageous.

In one enhanced embodiment the connection arrangement includes the contact clamps for a single jumper plus bus termination switching means, the bus termination switching means enabling or disabling a termination of the at least one twisted pair cable when the single jumper is plugged in or plugged out. This embodiment admits for the solution with only two additional pins in the connection arrangement. The jumper if plugged in will be placed in contact clamps which are contacted with these two pins. The solution with only two additional pins is appropriate if bus connectors need to be used with a minimum size and low costs. Another advantage relates to the long-term reliability of the connectors. There is a lesser risk of corrosion and contact failures if the connectors are equipped with a minimum number of pins. The pins may have a bigger thickness at connectors of equal size increasing the contact quality and mechanical stability.

For the bus termination switching means it is advantageous, that at least one electronic switch is included which is controlled by the voltage drop that occurs once the single jumper is plugged in or plugged out in the corresponding contact clamps. Such electronic switches can either be provided in discrete form in an electronic circuitry or in integrated form in an integrated circuitry. Also, different types of electronic switches are available so such that there is great flexibility in configuring the electronic circuitry of the bus termination switching means.

Particularly transistors may be used as electronic switches. There are many different types of transistors available which can be used on an as needed basis. For an "active Low" configuration of the bus termination switching means with an N-channel enhancement mode MOSFET transistor, it is advantageous that the bus termination switching means further include an inverter, wherein the input of the inverter is connected to a pull-up resistor such there is High potential at the input of the inverter. The inverter reverts the potential at its input such there is Low potential at the gate electrode and the N-MOSFET transistor is kept in non-conductive state. If the pin connected with the gate of the N-MOSFET transistor is brought to Low potential, that is, there is High potential at the gate because of the inverter, the MOSFET transistor is switched to conductive state, thereby enabling bus termination. The inverter converts the Low potential to High potential at its output such that the transistor is brought to the conductive state. The pull-up resistor has the effect that bus termination remains inactive as long as the jumper is not placed in the contact clamps (normally off configuration).

For the active Low configuration, it is advantageous that the first contact clamp is connected to the input of the inverter and the second contact clamp is connected to ground either directly or via a resistor. The pull-up resistor is also connected to the conductor path connecting the first connector clamp with the input of the inverter.

This solution has the further advantage that the second contact clamp may be electrically connected to a shielding of the twisted pair cable. In that case where a shielded bus cable is used, there is only the need for a single additional pin on the connector arrangement. A high-ohmic resistor (preferably 11 kΩ) may be positioned between the second contact clamp and ground. Preferably, the resistor type must be dimensioned so that a long-term failure current can be endured due to a reverse polarity failure.

Another embodiment of the disclosure concerns an "active High" configuration of the bus termination switching means. In that configuration the at least one electronic switch is likewise a transistor, in particular N-channel enhancement mode MOSFET transistor, wherein the gate electrode of the transistor is connected to a pull-down resistor and to a first contact clamp for the single jumper and wherein a second contact clamp for the single jumper is connected to a voltage source. The advantage of this configuration is that there is no need for putting an inverter into the circuit configuration.

An embodiment that does not require electronic switches is also proposed. Such variant includes the contact clamps for two jumpers in the connection arrangement, where the first jumper if plugged-in or plugged-out in the corresponding contact clamps connects the first bus wire of the twisted pair cable with a first end of a termination circuit and where the second jumper if plugged-in or plugged-out in the corresponding contact clamps connects the second bus wire of the twisted pair cable with a second end of the termination circuit.

All the different variants and embodiments are suitable for the two most common bus termination techniques standard termination and split termination.

For implementing a termination it is advantageous that the termination circuit, includes a single termination resistor for a standard termination or a split termination circuit arrangement including two termination resistors connected in series and one coupling capacitor, wherein the coupling capacitor is connected to ground and to the series connection of the two termination resistors.

Proposed embodiments can advantageously be utilized in a bus node that further includes an electronic unit being adapted to perform control of an actuator of a vehicle and/or being adapted to perform data acquisition of a sensor unit of a vehicle.

One example of an advantageous use case for the disclosure is an electronic unit being adapted to perform control of at least one magnetic valve of an electronic controlled air suspension system ECAS of a vehicle.

In the same way an electronic unit might be adapted to perform data acquisition of a sensor of an electronic controlled air suspension system ECAS of a vehicle, in particular distance sensor or pressure sensor.

Another embodiment of the disclosure concerns a plug-in connector for connecting a communication bus to a socket of a bus node according to the disclosure. It is proposed that the plug-in connector includes the contact clamps for two jumpers and the contact clamps for the twisted pair wires of the communication bus, where the first jumper connects the first twisted pair wire of the communication bus with a first end of a termination circuit in the bus node when the first jumper is plugged in, and where the second jumper connects the second twisted pair wire of the communication bus with the second end of the termination circuit in the bus node when the second jumper is plugged in. Such a plug-in connector is suited for a network that has been adapted to provide a connection arrangement for two jumpers.

Likewise, a further embodiment of the disclosure relates to a plug-in connector for connecting a communication bus to a socket of a bus node according to the disclosure, which is characterized in that the plug-in connector includes the contact clamps for a single jumper and the contact clamps for the twisted pair wires of the communication bus, where a first contact clamp for the single jumper connects a control line of a bus termination circuit arrangement and the second contact clamp connects a supply voltage line or ground line when the plug-in connector is plugged-in in the socket of the bus node. This embodiment is adapted for the use of the single jumper solution according the disclosure.

An enhanced solution for the single jumper adapted plug-in connector includes that the second contact clamp further connects a shielding of the twisted pair wires cable. That solution is suitable for shielded twisted wire pair cable termination where only one additional pin at the cable connector is required.

BRIEF DESCRIPTION OF DRAWINGS

The invention will now be described with reference to the drawings wherein.

DETAILED DESCRIPTION

Figure 1:
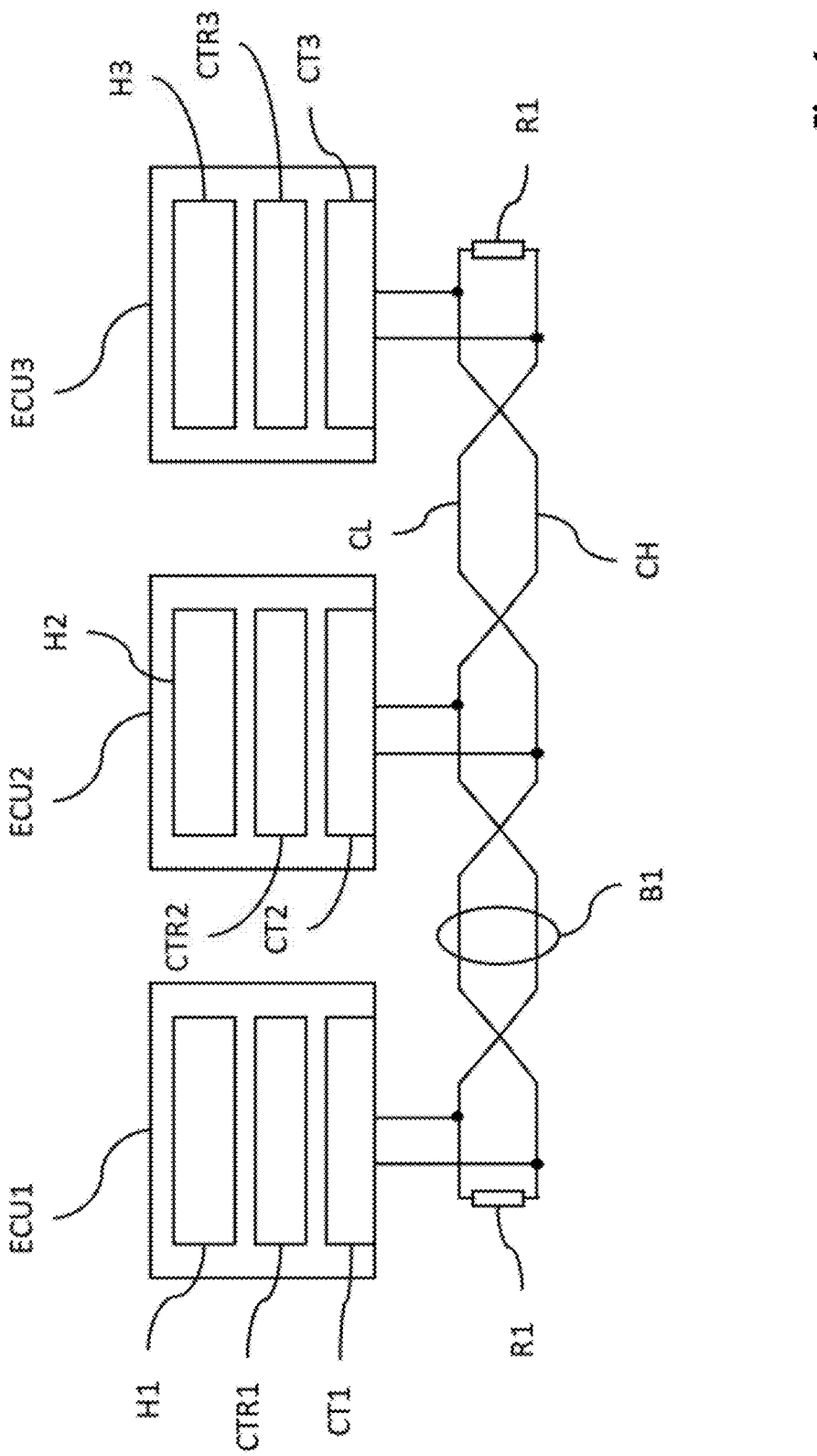
FIG. 1 shows the principle of crosslinking electronic components via a CAN bus.
Figure 2:
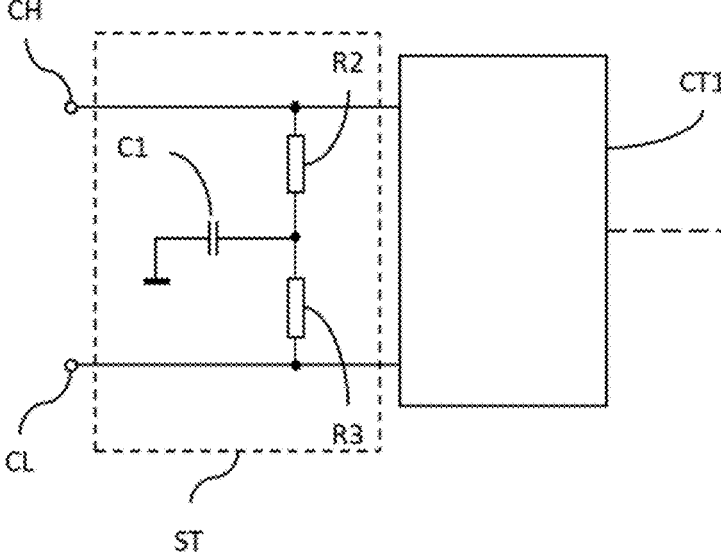
FIG. 2 shows a circuit diagram for implementing split termination at a CAN node.
Figure 4:
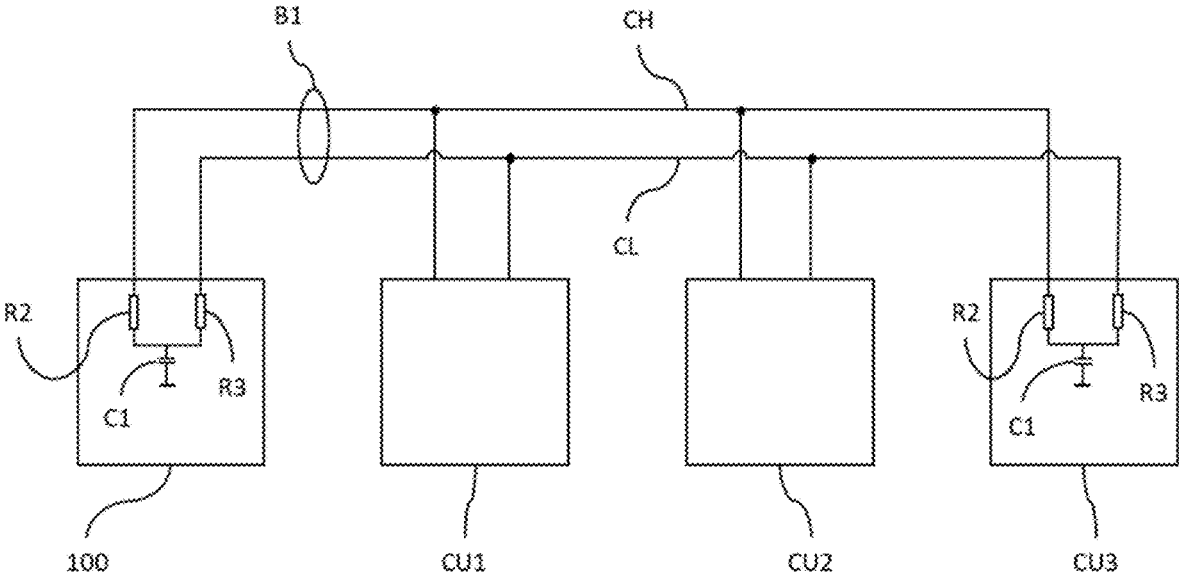
FIG. 4 shows the use of the split termination implementation for the end point nodes of the CAN bus in the commercial vehicle depicted in FIG. 3.

FIG. 4 shows the ECAS ECU 100 and the three ECAS devices CU1-CU3 and their connection to the CAN bus B1. ECAS ECU 100 and end point ECAS device CU3 include bus termination circuits in the form of split termination with terminations resistors R2 and R3 and coupling capacity C1 in-between.

An efficient series production of equitable ECAS devices CU1-CU3 demands for an identical circuit configuration. To deal with that, it is an idea of the disclosure to provide a termination circuit in each of the ECAS devices CU1-CU3, either in the form of standard termination or split termination. The termination circuit will become part of a wider bus termination circuit arrangement which is enhanced with circuitry which supports the placing of simple configuration elements with which bus termination can be activated or deactivated at each ECAS device CU1-CU3. Such simple configuration elements correspond to hardware means. Examples are simple jumpers and switches, for example, DIP switches. DIP switches however have not the same level of reliability as jumpers particularly in terms of protection against humidity and dirt and mechanical vibration. Jumpers will be placed in corresponding contact clamps where they may stay over the lifetime of the product. Another more sophisticated example of a configuration element is a photosensitive material. Such a device is known in the form of an EPROM memory which will be electrically programmed. Then after the individual ECAS-device has been mounted during series production of the vehicle, the EPROM memory will be erased manually by the worker with the help of an ultraviolet lamp for the ECAS device where a bus termination is needed. The bus termination circuit arrangement can be configured such that termination is normally off and only after the EPROM memory has been erased is switched on or vice versa.

Figure 5:
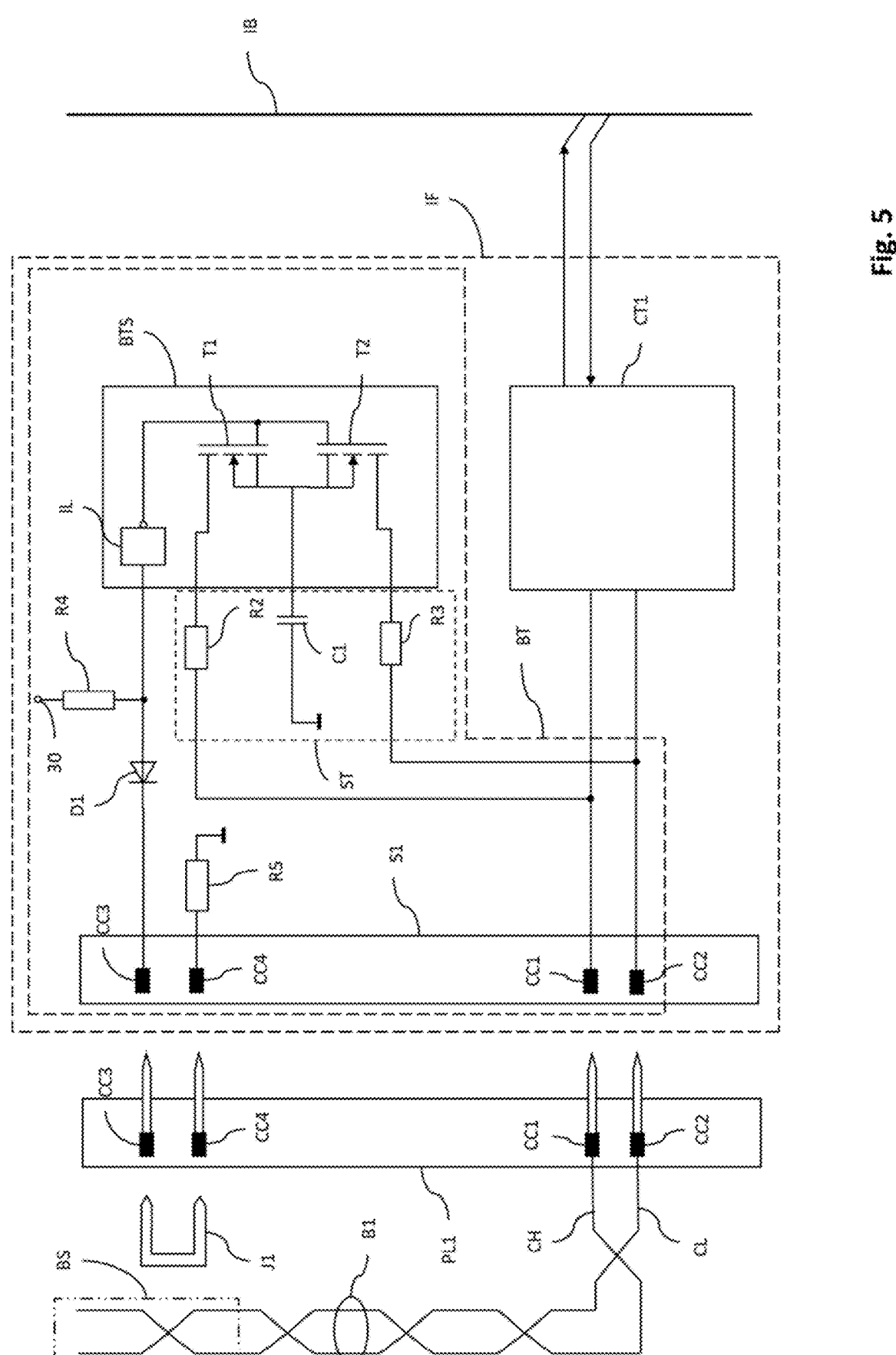
FIG. 5 shows a switchable CAN bus termination solution based on a simple configuration device in the form of a single jumper for an active Low implementation.

FIG. 5 shows a first detailed embodiment of the disclosure for the solution that a single jumper is used as the configuration element. Reference sign IF denotes a CAN bus interface circuit. Normally a CAN bus interface consists of a CAN transceiver and a CAN controller. Here, only the CAN transceiver CT1 is depicted. It is however shown that the CAN transceiver CT1 is connected to the internal bus IB which connects the CAN transceiver CT1 with a CAN controller chip (not shown) which may be standalone chip or integrated in a host controller of the ECAS device. The twisted wire pair of the CAN bus B1 is depicted on the left side. With reference sign BS a bus shielding is labelled. This is a conventional one layer or two layers shielding of metallic material as is commonly known in form of a wire mesh or metallic foil. The bus cable ends in a plug-in connector PL. There are a number of contact pins provided in the plug-in connector PL. The CAN High bus line CH is crimped to a first pin of the plug-in connector PL at the contact place CC1. The CAN Low bus line CL is crimped to a second pin of the plug-in connector PL at the contact place CC2. In addition, there are two additional pins provided in the plug-in connector PL. One is combined with a contact clamp CC3 and the other with the contact clamp CC4. A jumper J1 may be placed into the contact clamps CC3 and CC4 for configuration purposes. The socket S1 into which the plug-in connector PL may be placed is mounted at the ECAS device CU1 to CU3. Socket S1 is equipped with the corresponding contact clamps CC1 to CC4 into which the contact pins from the plug-in connector PL will be inserted. Interface circuit IF further includes a bus termination circuit arrangement BT. This contains a termination circuit ST, bus termination switching means BTS and further discrete elements. Most important are the contact clamps CC1 to CC3 in the socket S1. CC1 and CC2 are connected with internal bus line which lead to the CAN bus transceiver CT1. These bus lines are also connected to termination circuit ST including the two resistors R2 and R3 and the coupling capacitor C1 of the split termination which has already been presented before. To this split termination circuit ST is added the bus termination switching means BTS. They include two transistors T1, T2 and one inverter IL. The transistors T1, T2 are exemplified as N-channel enhancement mode MOSFET transistors. The output of the inverter IL is connected to the gate electrodes of the transistors T1, T2. The drain electrode of Transistor T1 is connected to resistor R2. The drain electrode of Transistor T2 is connected to resistor R3. The source electrodes of transistor T1 and T2 are both connected to capacitor C1. Input of inverter IL is connected to a diode D1 which is switched in forward direction to contact clamp CC3. A high-ohmic pull-up resistor R4 is switched to a supply voltage and placed in front of diode D1. A resistor R5 is connected to contact clamp CC4 and switched to ground potential.

Figure 3:
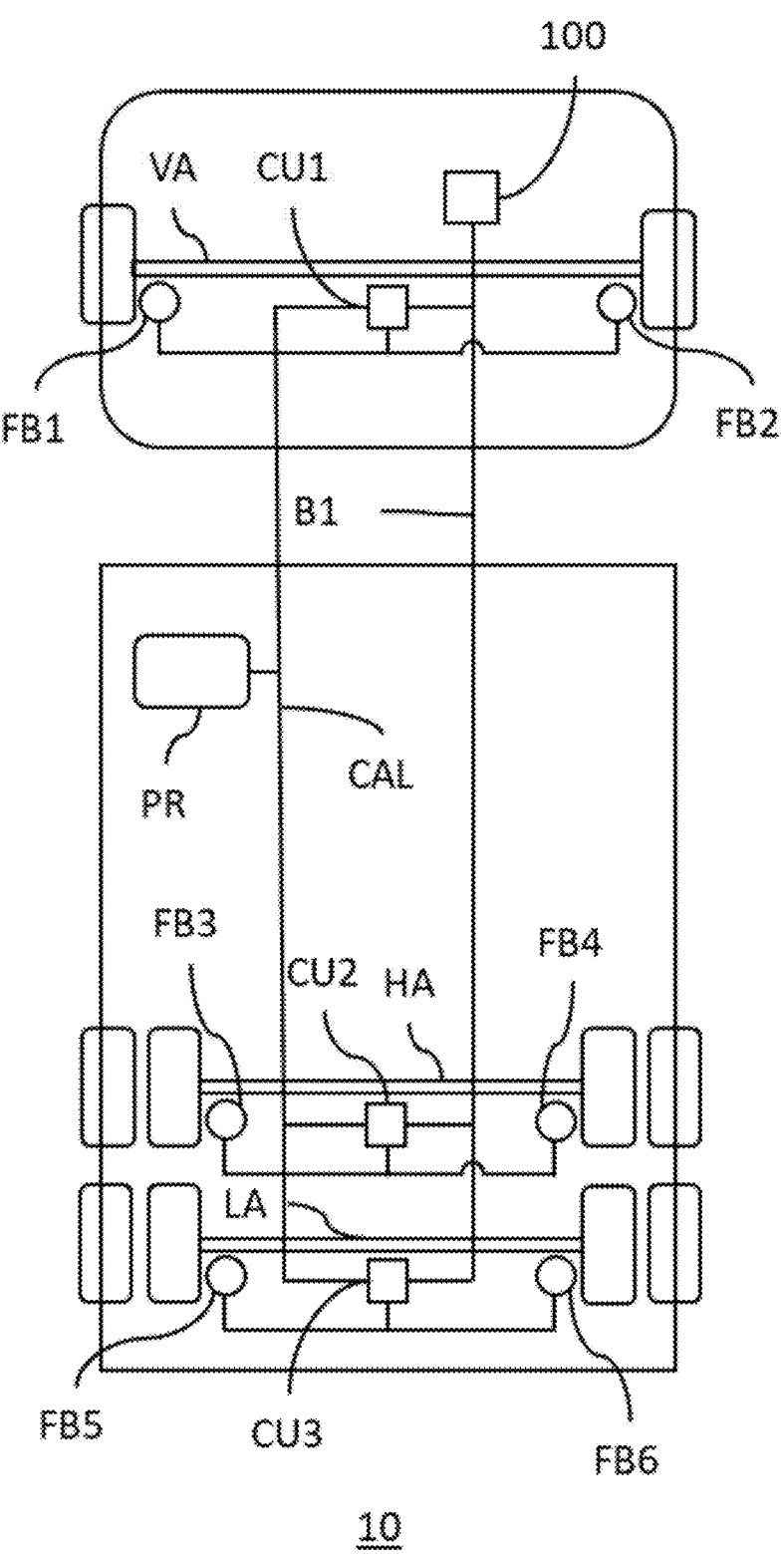
FIG. 3 shows a commercial vehicle with 3 axles.

The bus termination circuit arrangement BT has a so-called "BT Normally Off" circuit configuration and its function is as follows: Once the plug-in connector PL is inserted into the socket S1, the following happens as long as the jumper J1 is not inserted. The bus wires CH and CL are connected with the CAN transceiver CT1 and the termination circuit ST. Split termination is not enabled since the potential remains High at the input of the inverter IL due to the pull-up resistor R4 which may have a resistance value of 11 kΩ which is low compared to the high ohmic resistance of the inverter IL. Since there is High potential at the input of the inverter IL, there is Low potential at the output such that the transistors are kept to non-conductive state via the gate electrodes. Now, if the jumper J1 is inserted into contact clamps CC3 and CC4 of the plug-in connector PL, the voltage drop via pull-up resistor R4 is increased because the resistor R5 to ground has a lower resistance, for example, 1 kΩ. This way, there is Low potential at the input of the inverter IL leading to High potential at the output, which then causes the transistors T1 and T2 to switch to a conductive state and consequently activates the termination circuit ST to work. Diode D1 only serves as a protection diode to against inadvertent reverse polarity contacting. Therefore, this diode D1 is not needed to fulfill the function of the bus termination circuit arrangement BT. The manufacturer can decide at which ECAS device CU1 to CU3 he wants to activate bus termination. As explained before, bus termination is required to be activated at least at the end points of the CAN bus B1. In the present example of FIG. 3 and FIG. 4 bus termination would only be activated at ECAS device CU3. Consequently, the jumper J1 would only be inserted at ECAS device CU3. It is added that for ECAS ECU 100 there is no need for a configuration possibility with jumpers, since bus termination would always be enabled. This can easily be done with hardwiring.

The supply voltage source 30 in an embodiment corresponds to "Clamp 30" which in the automotive field corresponds to the battery voltage. In another embodiment the supply voltage source corresponds to "Clamp 15" which in the automotive field corresponds to a switched battery voltage, for example, after pressing the start button, this supply voltage will be provided.

Due to the high-ohmic resistor R5 (preferably 11 kΩ) between the contact clamp CC4 and ground, the pin at contact clamp CC4 can be used to also contact a CAN-bus shielding BS. CAN-bus shielding BS is not always needed, but some customers prefer to have CAN-bus shielding BS since it improves the noise immunity. This is a further advantage of this circuit configuration. The resistor type must be dimensioned so that a long-term failure current can be endured due to occurrence of an inadvertent reverse polarity failure. Further, a pull-up resistor needs not necessarily to be provided in the form of a single physical part. This can also be achieved by another circuitry including several passive and active electronic components. For example, this might be advantageous to achieve lower quiescent current.

Figure 6:
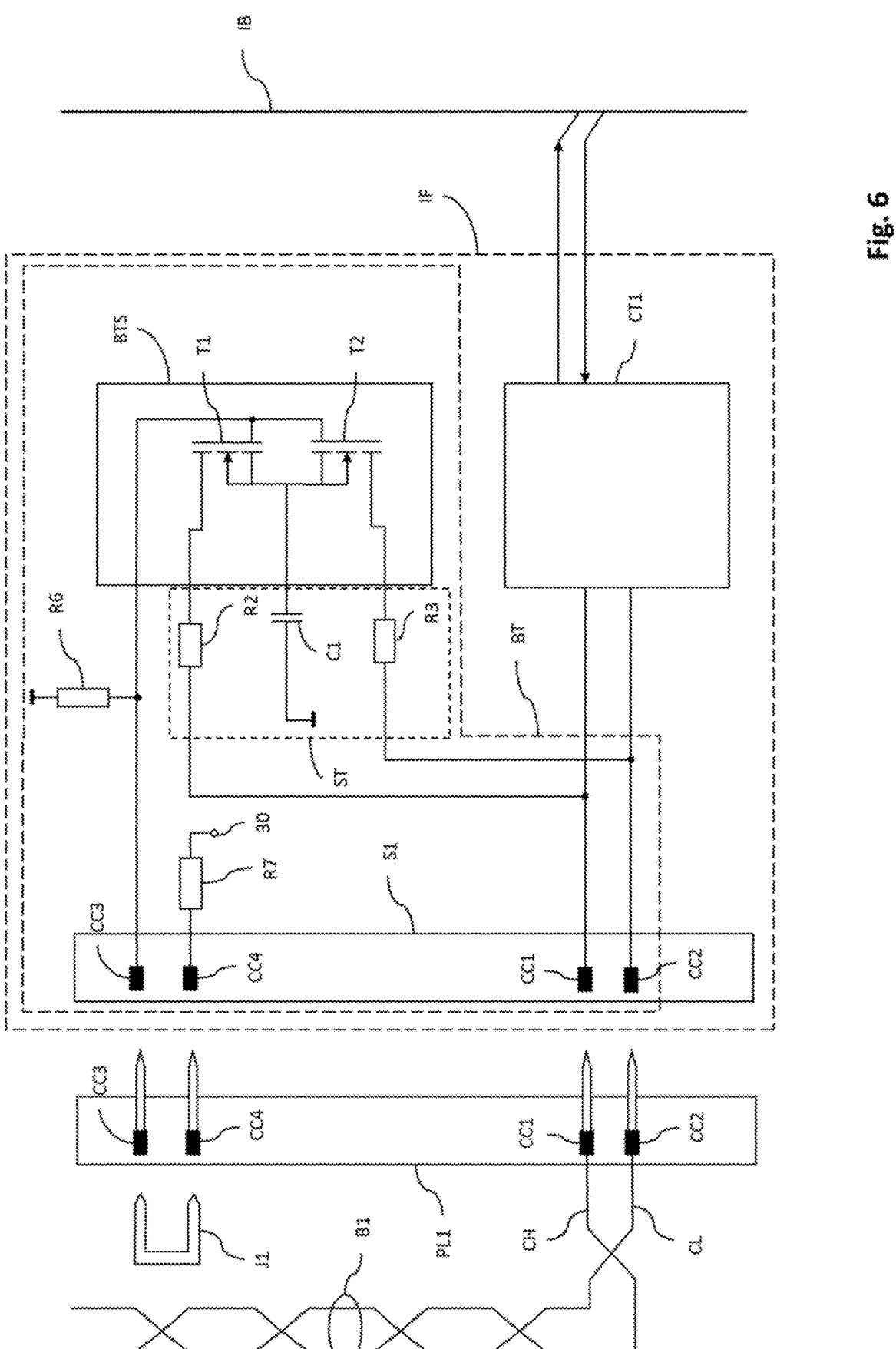
FIG. 6 shows a switchable CAN bus termination solution based on a simple configuration device in the form of a single jumper for an active High implementation.

FIG. 6 shows a proposal for a so-called "Active High" configuration of the circuit configuration. Identical reference signs denote the same components as shown in FIG. 5. The difference is that the inverter IL is superfluous. When inverter IL is taken out, there is however a need for adaptation of the voltage supply. Resistor R6 replaces the pull-up resistor R4 but is connected to ground potential and thus serves as a pull-down resistor. Ground potential in automotive field is often referred to be "Clamp 31". Resistor R7 replaces the pull-down resistor R5 and is connected to the supply voltage source 30. Resistor R7 may have a resistance of 11 kΩ and resistor R6 may have a resistance of, for example, 100 kΩ. As long as the jumper J1 is not placed, the potential at the gate electrode of the transistors T1 and T2 remains "Low" thereby keeping the transistors T1 and T2 in non-conductive state due to the pull-down resistor. If jumper J1 is inserted, the pull-up resistor R7 provides for High potential at the gate electrodes and the transistors T1 and T2 are switched to conductive state, thereby activating split termination. Therefore, the "active High" configuration according to FIG. 6 provides for the same "BT Normally Off" functionality as the "active Low" configuration in FIG. 5.

It is likewise possible to adapt the circuit configurations such that a "BT Normally On" functionality is resulting. This can be easily achieved by replacing the enhancement mode MOSFET transistor with a depletion mode MOSFET transistor. Alternatively, the different circuit configurations are also possible using bipolar transistors or any other form of electronic switches including so-called "bilateral switches".

Figure 7:
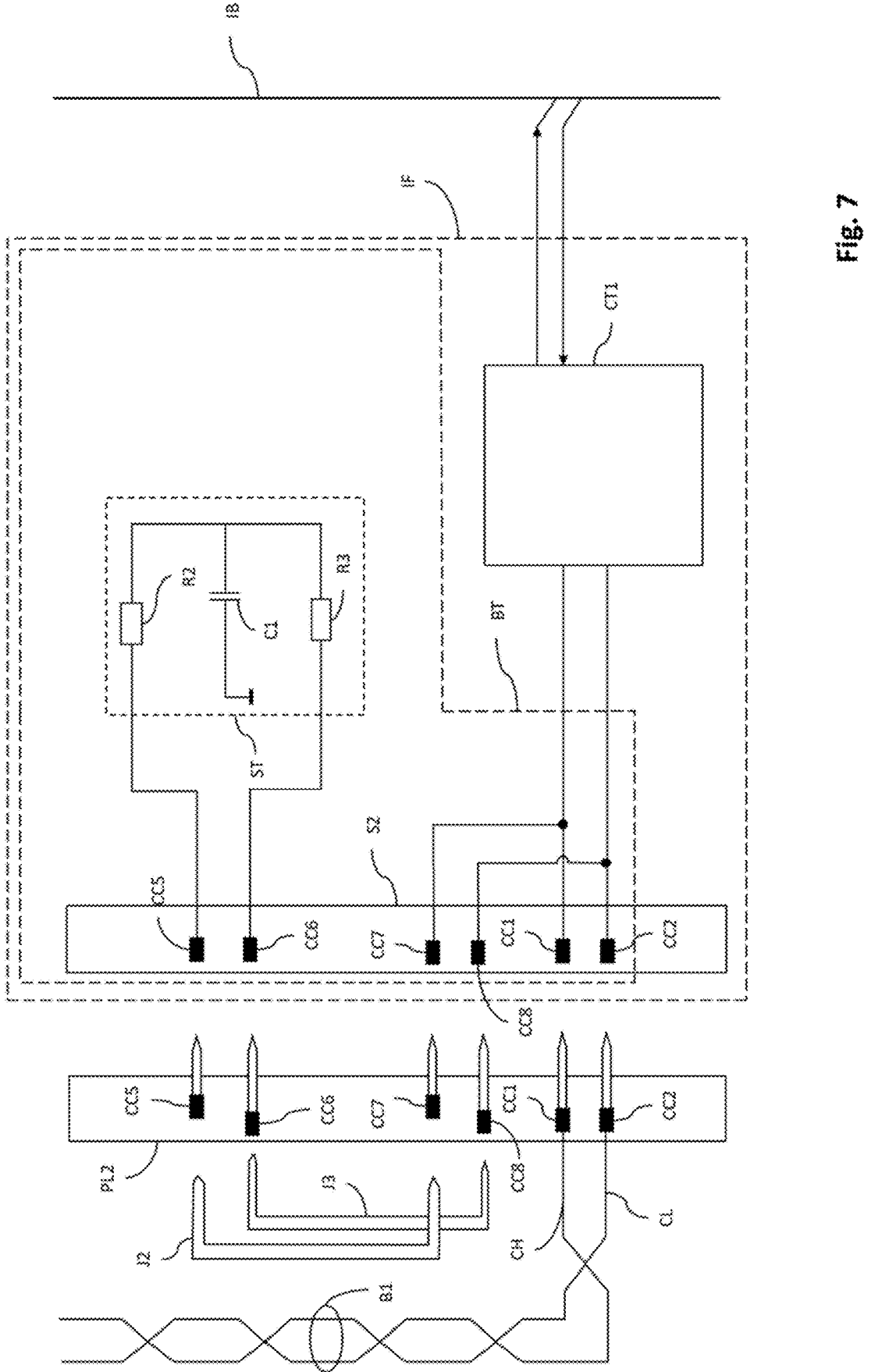
FIG. 7 shows a second proposal for a switchable CAN bus termination solution based on two configuration devices in the form of a jumper; and, FIG. 8 shows the principle of crosslinking three equitable bus nodes via a CAN bus cables where only at the end point bus node the two jumpers are placed such that bus termination is active only at the end point bus nodes.

FIG. 7 shows another embodiment where two jumpers are used as configuration elements. Again, identical reference signs denote identical components as in FIG. 5. The two-jumper solution has the advantage, that there is no need for bus termination switching means in the interface circuit IF. The termination circuit ST remains in the interface circuit IF but they will be manually contacted thereby eliminating any need for electronic control. The bus termination switching means in the form of two transistors and one inverter can be spared out thus making the electronic circuit configuration cheaper. As long as no jumper is placed in the plug-in socket PL, the ECAS device remains without bus termination. The first jumper J2 will be placed in contact clamps CC5 and CC7. This way, the bus wire CH will be connected to the resistor R2 branch of the split termination circuit ST. The second jumper J2 will be placed in contact clamps CC6 and CC8. This way, the bus wire CL will be connected to the resistor R3 branch of the split termination circuit ST. This solution has the advantage that the costs for the bus termination circuit arrangement BT are subjectively reduced while on the other hand the costs for the plug-in connector PL2 and the socket S2 are increased. Therefore, there is more flexibility in selecting a circuit configuration on an as needed basis.

In a further embodiment of the disclosure it is possible to combine the above explained hardware configuration solutions with the software controlled termination activation method by implementing a wired OR characteristic (either jumper-based activation or software controlled activation) or a wired AND characteristic where bus termination activation/deactivation would only be valid if the software controlled activation would only performed if the activation is confirmed with the hardware based configuration and vice versa (two factor confirmation).

Figure 8:
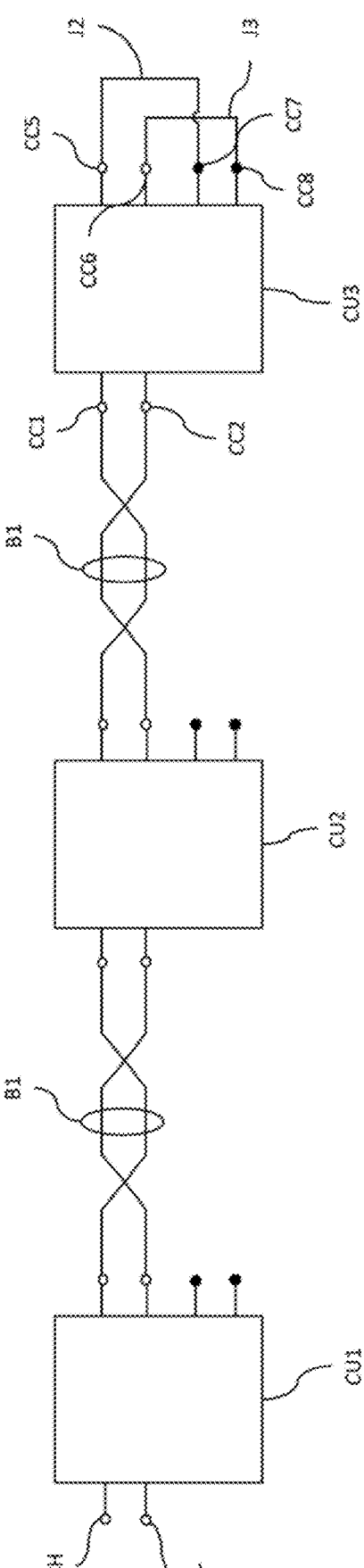

FIG. 8 shows the typical practical realization of the connection of equitable bus nodes to the CAN bus. As explained before, the CAN bus topology corresponds to a linear bus topology. This can be achieved by using one single linear bus cable B1 as is shown in FIG. 4 to which the end point bus nodes 100 and CU3 are connected and using separate cable branches for the bus nodes CU1 and CU2 in-between. These cable branches are physically connected to the linear bus cable B1. Instead of using this form of wire harness, which is not easy to produce, it is more practical to use the kind of concatenation of CAN bus cables illustrated in FIG. 8. There are actually two cables attached to the plug-in connectors for the ECAS devices CU1 and CU2. For ECAS device CU1, the first cable comes from ECAS ECU 100 and the second cable extends the bus line to ECAS device CU2. For the plug-in connector of ECAS device CU2 the first cable comes from ECAS device CU1 and the second cable extends the bus line to ECAS device CU3. For ECAS device CU3 there is only one cable attached to the plug-in connector which comes from ECAS device CU3. Therefore, the two pins in the plug-in connector PL which are provided for extending the bus line further are left open, since ECAS device CU3 is an end point device. Since the two pins are unused, they can be used for bus termination configuration by placing two jumpers as shown in FIG. 7 and also illustrated in FIG. 8. The different pins of plug-in connector PL of ECAS device CU3 are labelled with the same reference signs as used in FIG. 7. It is noted, that while FIG. 8 shows that the pins CC1 and CC2 are on the left side, they are actually located at the ride side where also the pins CC5 to CC7 are located. The illustration is simplified for drawing purposes in this regard.

FIGS. 5 to 7 illustrate the jumpers J1 to J3, in rigid wire form. It is however denoted that, jumpers may be used which are made of flexible wires, too. Here, the single jumper is coming out of a connector and is going back to the same connector. In another implementation there may be a two-connector solution used for concatenating the bus nodes. In that case the jumper may come from out of a first connector and go to the second connector.

All examples mentioned herein, as well as conditional language, are intended to be understood as not being limited to such specifically cited examples. For example, it will be appreciated by those skilled in the art that the block diagram presented herein represents a conceptual view of exemplary circuitry. Similarly, it will be appreciated that an illustrated flowchart, state transition diagram, pseudo-code, and the like are various variants for representing processes that may be stored substantially on computer-readable media and thus executable by a computer or processor.

The disclosure is not limited to the embodiments described here. There is room for various adaptations and modifications that those skilled in the art would contemplate based on their skill in the art as well as belonging to the disclosure. Particularly the application of the disclosure is not limited to equitable ECAS devices. Other equitable devices may exist in a vehicle in multiple forms. A vehicle is typically equipped with a plurality of brake actuators for the different wheels, for example, for implementing an electric parking brake which are also electronically controlled via CAN bus. Also, the disclosure is not limited to applications via CAN bus. There are multiple communication bus systems readily available on the market which make use of physical media in form of twisted wire pair cables where bus termination is also an issue. The disclosure may also be used for these communication bus systems. Moreover, the disclosure may be used for communication bus systems outside the automotive field such as field bus systems for machinery control, process control, plant control, et cetera.

It is understood that the foregoing description is that of the preferred embodiments of the invention and that various changes and modifications may be made thereto without departing from the spirit and scope of the invention as defined in the appended claims.

REFERENCE SIGNS (PART OF THE DESCRIPTION)

10 vehicle
100 ECAS ECU
B1 communication bus
BS bus shielding
BT bus termination circuit arrangement
BTS bus termination switching means
ECU1-ECU3 Electronic Control Unit
D1 diode
CAL pressure line
CC1-CC8 connector clamp
CH CAN High bus line
CL CAN Low bus line
CT1-CT3 CAN-transceiver
CTR1-CTR3 CAN-controller
CU1-CU3 magnetic valve control unit
C1 capacitor
FB1-FB6 air spring bellows
HA back axle
H1-H3 host
IB internal communication bus
IF interface circuit
IL inverter
J1-J3 jumper
LA lift axle
PR pressure reservoir
PL1-PL2 plug-in connector R1 termination resistor
R2, R3 split termination resistor
R4 pull-up resistor
R5 pull-down resistor
R6 pull-down resistor
R7 pull-up resistor
S1 plug-in socket
ST split termination
T1-T2 transistor
VA front axle

The invention claimed is:

1. A bus node for a communication bus having end points, said bus node comprising:
an interface circuit to said communication bus;
said communication bus requiring a bus termination at least at the end points thereof;
said interface circuit including a bus termination circuit arrangement; and,
said bus termination circuit arrangement including at least a connection arrangement to at least one configuration component, wherein said configuration component comprises at least a first jumper, wherein said communication bus comprises at least one single twisted pair cable as physical medium, wherein said jumper is a single jumper; said connection arrangement comprises first and second contact clamps for said single jumper plus a bus termination switch; and, said bus termination switch is configured to enable or disable a termination of said at least one twisted pair wire when said single jumper is plugged in or plugged out, wherein said connection arrangement includes at least two contact clamps; said bus termination switch includes at least one electronic switch controlled by a voltage drop that occurs once the single jumper is plugged in or plugged out in the corresponding ones of said first and second contact clamps.

2. The bus node of claim 1, wherein for an active low configuration of said bus termination switch, said at least one electronic switch is a transistor; and, wherein the bus termination switch further includes an inverter which controls the at least one transistor; and, the input of the inverter is connected to a pull-up resistor.

3. The bus node of claim 2, wherein said transistor is an N-channel enhancement mode MOSFET transistor.

4. The bus node of claim 2, wherein said first contact clamp is connected to the input of said inverter and said second contact clamp is connected to ground either directly or via a resistor.

5. The bus node of claim 4, wherein said second contact clamp is also electrically connected to a shielding of said twisted pair cable.

6. The bus node of claim 1, wherein for an active high configuration of said bus termination switch, said at least one electronic switch is a transistor having a control electrode; and, said control electrode of said transistor is connected to a pull-down resistor and to said first contact clamp for said single jumper and said second contact clamp for the single jumper is connected to a voltage source.

7. The bus node of claim 6, wherein said transistor is an N-channel enhancement mode MOSFET transistor.

8. The bus node of claim 1, said bus node further comprising at least one of the following: i) an electronic unit configured to perform control of an actuator of a vehicle; and, ii) an electronic unit configured to perform data acquisition of a sensor unit of a vehicle.

9. The bus node of claim 8, wherein said electronic unit is configured to perform control of at least one magnetic valve of an electronic controlled air suspension system of a vehicle.

10. A bus node for a communication bus having end points, said bus node comprising:
an interface circuit to said communication bus;
said communication bus requiring a bus termination at least at the end points thereof;
said interface circuit including a bus termination circuit arrangement; and,
said bus termination circuit arrangement including at least a connection arrangement to at least one configuration component, wherein said configuration component comprises at least a first jumper, wherein said communication bus comprises at least one single twisted pair cable as physical medium, wherein said connection arrangement includes fifth, sixth, seventh and eighth contact clamps for second and third jumpers where said second jumper, when plugged-in or plugged-out in the corresponding ones of said contact clamps, connects a first bus wire of the twisted pair cable with a first end of a termination circuit and where the third jumper, when plugged-in or plugged-out in the corresponding ones of said contact clamps, connects a second bus wire of the twisted pair cable with a second end of said termination circuit.

11. The bus node of claim 10, wherein said termination circuit includes one of the following: i) a single termination resistor; and, ii) a split termination circuit arrangement including two termination resistors connected in series and one coupling capacitor; and, said coupling capacitor is connected to ground and to said series connection of said two termination resistors.

12. A plug-in connector for connecting a communication bus having end points to a socket of a bus node, the bus node including:
an interface circuit to said communication bus;
said communication bus requiring a bus termination at least at the end points thereof;
said interface circuit including a bus termination circuit arrangement; and,
said bus termination circuit arrangement including at least a connection arrangement to at least one configuration component;
said configuration component including first and second jumpers and said connection arrangement including a plurality of contact clamps; and, said communication bus includes twisted pair wires as a physical medium;
said plug-in connector comprising:
four of said contact clamps assigned to said first and second jumpers;
two additional ones of said plurality of contact clamps assigned to said twisted pair wires of said communication bus; and,
said first jumper connects the first twisted pair wire of the communication bus with one end of a termination circuit in said bus node when the first jumper is plugged in, and where said second jumper connects the second twisted pair wire of the communication bus with the other end of the termination circuit in said bus node when said second jumper is plugged in.

13. A plug-in connector for connecting a communication bus having end points to a socket of a bus node, the bus node including:

an interface circuit to said communication bus;

said communication bus requiring a bus termination at least at the end points thereof;

said interface circuit including a bus termination circuit arrangement; and, said bus termination circuit arrangement including at least a connection arrangement to at least one configuration component;

said configuration component including first and second jumpers and said connector arrangement including a plurality of contact clamps; and, said communication bus including twisted pair wires as a physical medium;

said jumper being a single jumper;

said connection arrangement providing first and second contact clamps of said plurality of contact clamps being for said single jumper plus a bus termination switch;

said bus termination switch being configured to enable or disable a termination of said at least one twisted pair wire when said single jumper is plugged in or plugged out;

said plug-in connector comprising:

said first and second contact clamps of said plurality of contact clamps assigned to said single jumper;

third and fourth contact clamps of said plurality of contact clamps assigned to said twisted pair wires of said communication bus;

said first contact clamp connecting a control line of a bus termination circuit arrangement and said second contact clamp connecting a supply voltage line or ground line when the plug-in connector is plugged-in in said socket of said bus node.

14. The plug-in connector of claim 13, wherein said second contact clamp further connects a shield of said twisted pair wires.

\* \* \* \* \*